United States Patent
Beane (10) Patent No.: US 7,252,120 B2
(45) Date of Patent: Aug. 7, 2007

(54) POWDER FEED APPARATUS, SYSTEM AND METHOD

(76) Inventor: Glenn Beane, 71 Stevens Rd., Hanover, NH (US) 03755

(*) Notice: Subject to any disclaimer, the term of this patent is extended or adjusted under 35 U.S.C. 154(b) by 155 days.

(21) Appl. No.: 10/918,941

(22) Filed: Aug. 16, 2004

(65) Prior Publication Data

US 2005/0056339 A1  Mar. 17, 2005

Related U.S. Application Data

(60) Provisional application No. 60/495,044, filed on Aug. 14, 2003.

(51) Int. Cl.
  *B65B 1/04* (2006.01)
(52) U.S. Cl. ............ 141/71; 141/67; 425/78; 425/258; 425/425
(58) Field of Classification Search ........... 141/67, 141/71–80; 264/437, 442, 517, 109; 425/77, 425/78, 258, 425
See application file for complete search history.

(56) References Cited

U.S. PATENT DOCUMENTS

| 4,653,957 A | * | 3/1987 | Smith et al. | 404/114 |
| 4,813,818 A | * | 3/1989 | Sanzone | 406/122 |
| 6,241,935 B1 | * | 6/2001 | Beane et al. | 264/437 |
| 6,736,626 B1 | * | 5/2004 | Lienau | 425/219 |

* cited by examiner

*Primary Examiner*—Steven O. Douglas
(74) *Attorney, Agent, or Firm*—Paul C. Remus; Devine, Millimet & Branch (57) ABSTRACT

A powder feed apparatus and method for increasing the rate of flow of powder fed through a powder feed system to a powder press. The apparatus includes a housing having a powder feed chamber, with a powder ingress opening and a powder egress opening, and at least one vibrator. The powder feed chamber is dimensioned to transmit a vibrational force from the vibrator to powder in it such that the velocity of the powder through the powder egress opening is increased over the velocity of the powder through the powder egress opening in the absence of the vibrational force (i.e. using only gravity feed).

19 Claims, 6 Drawing Sheets

POWDER FEED APPARATUS, SYSTEM AND METHOD

CROSS-REFERENCE TO RELATED APPLICATIONS

The present application claims the benefit of Ser. No. 60/495,044 filed Aug. 14, 2003, which is incorporated herein by reference.

FIELD OF THE INVENTION

The present invention relates to the field of transporting powder to a die cavity of a powder press and, in particular, to a system that increases the rate of flow of a powder into the cavity while maintaining an evenly distributed particulate density.

BACKGROUND OF THE INVENTION

In parts manufacturing using presses, there are two opposing ways to press a part. Traditional presses work much like a cookie-cutter, using a die to stamp the desired product from a larger solid piece of starting material. This type of press, though capable of quick repetition, necessitates large quantities of starting material—much of which simply goes unused in the stamping process—to produce the product. Furthermore, products manufactured by this type of press often require additional finishing work due to the inherent clumsiness of the mechanical stamping process, wear on the die, imperfections in the starting material, and various other problems.

More nimble than their traditional counterparts, hydraulic powder presses can inexpensively produce parts of great complexity without the scrap inherent in traditional stamping processes. Unlike traditional stamping presses, the hydraulic powder press uses a powdered starting material, which is placed into a die cavity and compressed between the walls of the die and one or more punches into the shape of the desired part. These presses customarily produce parts that exhibit a high quality and rarely require any additional finishing work.

Uniform material transfer is key to a powder press design that produces quality parts. Known simple gravity feed methods deliver particles into die cavities at a density that is roughly equivalent to the bulk density (i.e., density of a bulk volume of the particles) of the particulate material. Because of gravity and frictional forces, a die cavity does not fill uniformly under such circumstances and such feed systems do not provide a uniform density of particulate material within the die cavity. Articles produced by these feed methods are often unsatisfactory, as the compacted parts are of non-uniform density, which makes them more prone to stress related cracking, especially upon die cavity ejection. These cracks are often only visible after sintering.

A number of techniques have been developed in order to overcome the problem of non-uniform powder density in a powder press. One group of techniques is found in U.S. Pat. Nos. 5,885,625, 5,885,496 & 5,945,135. Each of these patents is directed to feed "shoes" and feed rings into which powder is disposed and fluidized using pulses of air in order to produce a uniformly dense powder. These devices are effective at eliminating the problem of disposing a uniformly dense powder within the die. However, the time required to fill these feed shoes and rings, close the necessary valves, fluidize the powder, and dispose the powder within the die cavity, is a significant limitation on the part-making capacity of a powder press.

Still another method, which was noted in the above-referenced patents, is commonly referred to as "shaking and baking." Using this method, a feed shoe is attached to a stepper motor and filled with powder. Once the feed shoe is filled and placed over the ingress opening of the die cavity, the stepper motor causes the feed shoe quickly to move forward parallel to the ingress opening, stop, move back in the same parallel direction, and stop, in a manner similar to that used by bakers to encourage movement of flour through a sifter. Although this method is used to enhance movement of the powder, as noted in the above-referenced patents, it is ineffective at creating a powder with substantially uniform density.

Rapid uniform material transfer is key to a powder press design that produces quality parts quickly. Technologies exist for controlling and moving the mechanical parts of powder presses at much faster rates than those presently being employed. However, the rate at which powder presses can produce articles is limited by the rate at which the feed shoe, feed ring or die cavity can be filled with powder. This rate is relatively slow using gravity to feed powders into the feed shoe, feed ring or die cavity. Accordingly, the present invention increases the rate at which powder is delivered to a feed shoe, feed ring or die cavity of a powder press while still disposing a uniformly dense powder therethrough.

SUMMARY OF THE INVENTION

The present invention is a powder feed apparatus and method for increasing the rate of flow of powder fed through a powder feed system to a powder press, using vibrational energy.

In its basic form, the powder feed apparatus of the present invention includes a housing having an outer surface, a powder ingress opening, a powder egress opening, and a powder feed chamber in communication with the powder ingress opening and the powder egress opening. The powder feed chamber is dimensioned to transmit a vibrational force upon powder disposed therethrough such that the rate of flow of the powder through the powder egress opening is increased over the rate of flow of the powder through the powder egress opening in the absence of the transmission of the vibrational force; i.e. using only gravity feed. The apparatus includes at least one vibrator in vibrational communication with the powder feed chamber. The vibrator is dimensioned and located such that it creates a vibrational force that is transmitted to the powder feed chamber at least partly in the direction of flow of the powder therein.

A preferred embodiment of the apparatus includes a means for isolating the vibrational force transmitted to the powder feed chamber. This means preferably takes the form of a frame in which the housing is mounted, and a pair of guides that extend from the sides of the housing through guide openings through the frame. These guides are slightly smaller than the guide openings and allow the housing to vibrate while retaining it within a fixed range of motion. An alternative embodiment replaces the frame with a pair of rails and a pair of guides that are affixed to the outer surface of the housing and are slidably disposed upon the rails to allow the housing to slide back and forth along the rails.

Another preferred embodiment of the present invention includes a single air driven turbine vibrator attached to the housing via an extension plate. Other embodiments utilize multiple vibrators. In these embodiments, each vibrator is dimensioned and located such that the two vibrators create vibrational forces that are transmitted to the powder feed chamber at least partly in the direction of flow of the powder.

In still another preferred embodiment, the powder feed chamber is angled downward from the powder ingress opening to the powder egress opening.

In its basic form, the powder feed system of the present invention for feeding powder to a powder press includes a source of a powdered material, a die cavity and the powder feed apparatus of the present invention for increasing the rate of flow of the powdered material from the source to the die cavity. When integrated into such a system, the powder ingress opening of the powder feed apparatus of the present invention is in communication with the source of powdered material, and the powder egress opening is in communication with the die cavity.

The present invention also includes a method for conveying powder to the die cavity of a powder press. This method consists of the steps of disposing a powder into a powder source, conveying a quantity of powder from the powder source to a substantially enclosed powder feed chamber, transmitting a vibrational force from a vibrator to the powder feed chamber, transmitting a vibrational force from the powder feed chamber to the quantity of powder therein to increase the rate of flow of the quantity of powder, and filling the die cavity with a predetermined quantity or volume of the powder. When these steps are completed, the volume of the powder within the powder receptacle is of substantially uniform density without the use of separate means, such as pulsed air, for fluidizing the powder.

Therefore, it is an aspect of the present invention to provide a powder feed apparatus and method capable of more quickly delivering quantities of powder into the die cavity of a powder press. It is a further aspect of the present invention to provide such a powder feed apparatus and method capable of disposing a uniformly dense powder within the die cavity of a powder press. It is a still further aspect of the present invention to provide a powder feed apparatus and method capable of delivering quantities of powder into a die cavity of a powder press with minimal moving parts. It is a still further aspect of the present invention to provide a powder feed apparatus and method capable of delivering quantities of powder into the die cavity of a powder press that minimizes pressed part irregularities.

These aspects of the invention are not meant to be exclusive and other features, aspects, and advantages of the present invention will be readily apparent to those of ordinary skill in the art when read in conjunction with the following detailed description of the invention and accompanying drawings.

DETAILED DESCRIPTION OF THE INVENTION

Figure 1:
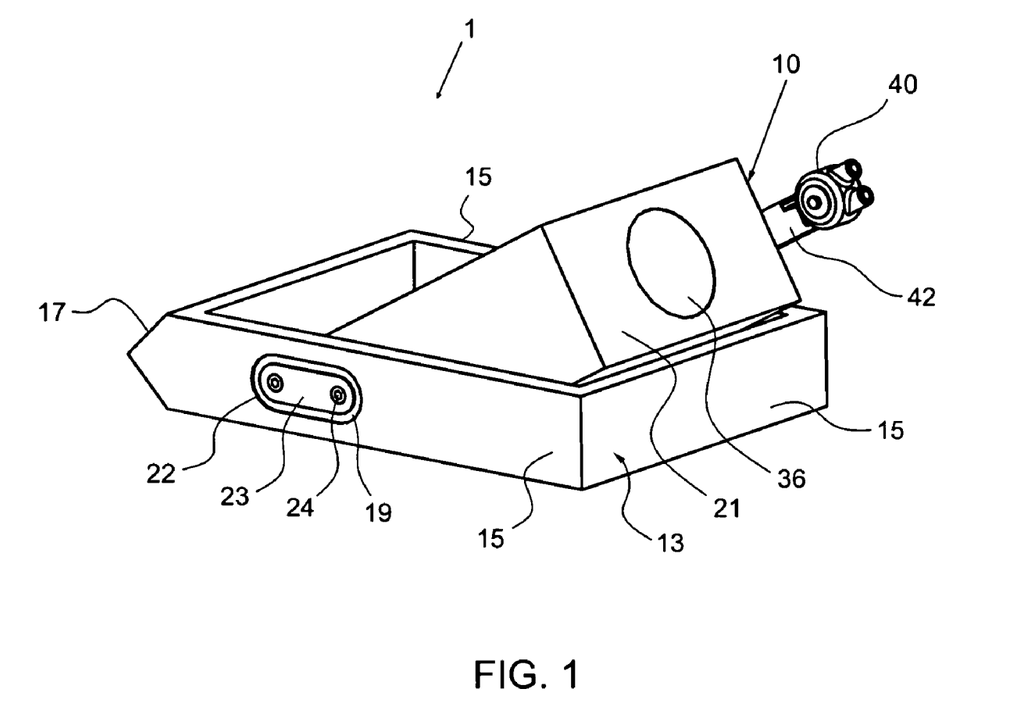
FIG. 1 is a front isometric view of a preferred embodiment of the powder feed apparatus of the present invention.
Figure 2:
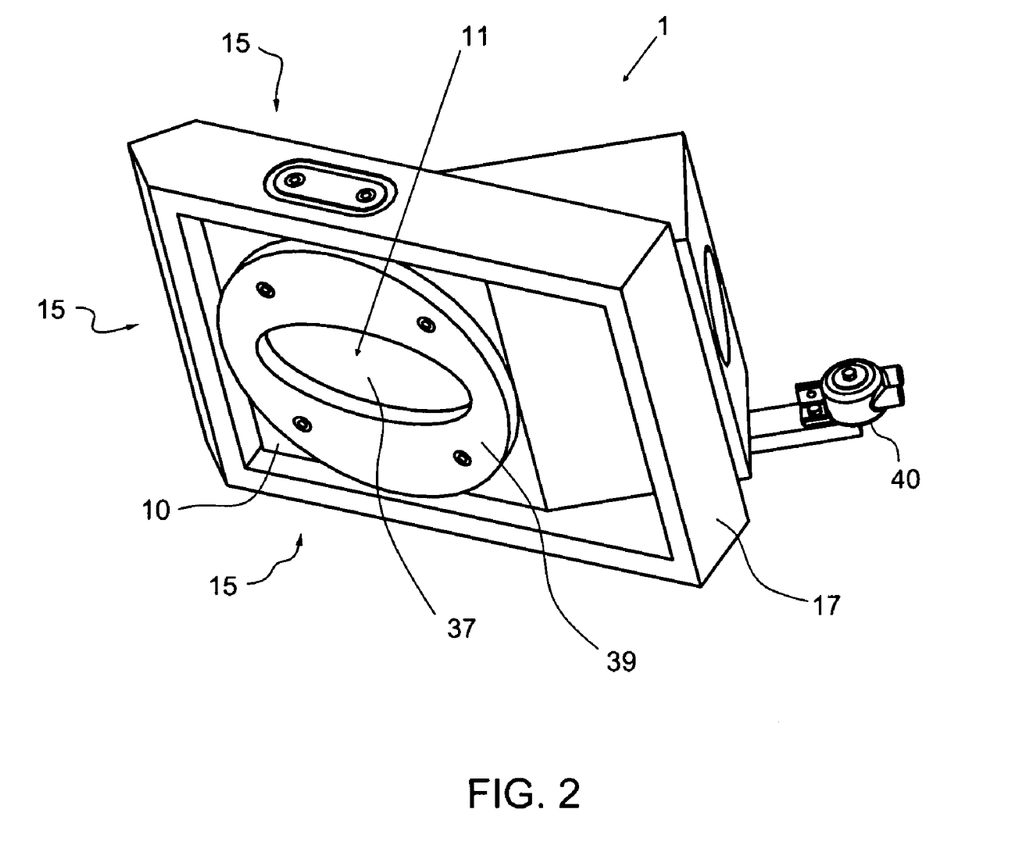
FIG. 2 is a bottom oblique view the powder feed apparatus of FIG. 1.
Figure 3:
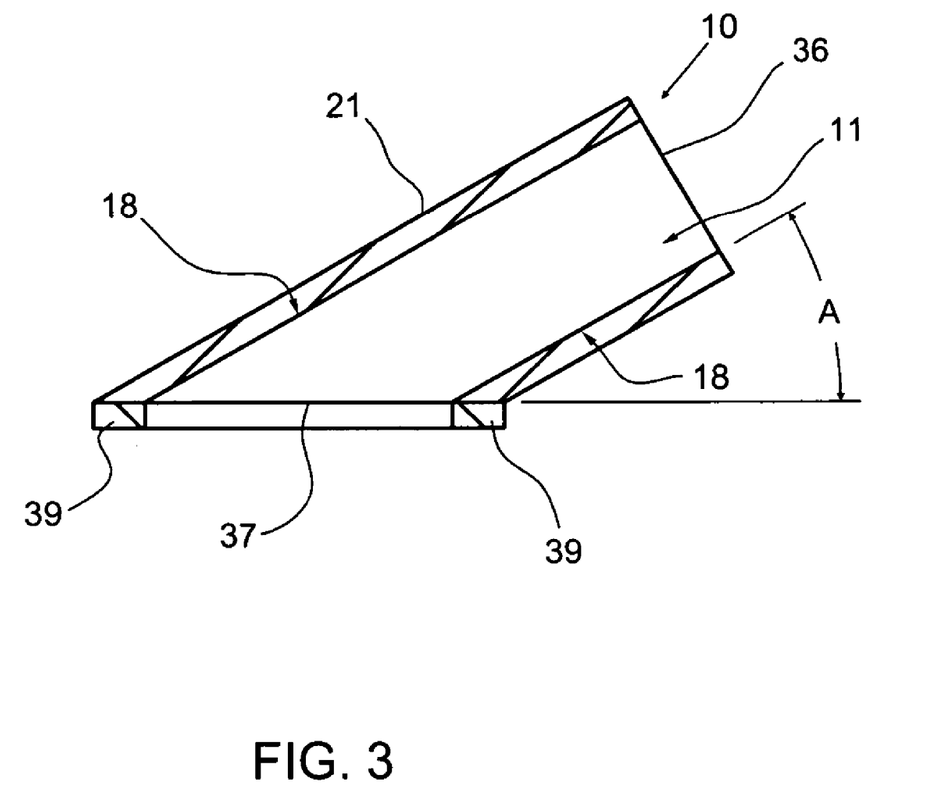
FIG. 3 is a cut away side view of the housing of the preferred powder feed apparatus of FIGS. 1 and 2.

Referring first to FIGS. 1-3, a preferred embodiment of the powder feed apparatus 1 includes a housing 10 having an outer surface 21, a powder ingress opening 36, a powder egress opening 37, and a powder feed chamber 11 in communication with the powder ingress opening 36 and the powder egress opening 37. At least one vibrator 40 is mounted in vibrational communication with the powder feed chamber 11 within the housing 10. The vibrator 40 is dimensioned and located such that it creates a vibrational force at least partly in the direction of the powder flow through the powder feed chamber that is transmitted to the powder feed chamber 11.

The housing 10 of the embodiment is a single unit that is preferably constructed of aluminum and sized appropriate to the quantity of powder necessary for the desired pressing operation (i.e., larger parts require more powder, which requires a larger housing 10 and vice versa). The housing 10 should be sized such that volume of powder within the powder feed chamber 11 of the housing 10 is greater than or equal to volume of powder needed in the die cavity.

The housing 10 of the preferred embodiment of FIGS. 1-3 has an outer surface 21 having an obliquely orientated rectangular prism shape. The powder feed chamber 11 is disposed through the housing 10 and, for manufacturing simplicity, is preferably a cylindrical bore through the housing 10, whereby inner walls of the housing 10 form the powder feed chamber 11. However, it is recognized that the powder feed chamber may take many forms, provided the chamber 11 allows the powder to flow in an unimpeded manner; i.e., the powder does not need to make dramatic changes in direction when passing therethrough, and it not substantially restricted by the egress opening 37. The powder feed chamber 11 is dimensioned to transmit a vibrational force upon powder disposed therethrough such that the rate of flow of the powder through the powder egress opening 37 is increased over the rate of flow at which the powder would flow through the same powder egress opening 37 in the absence of the transmission of the vibrational force (i.e., using only gravity feed). A preferred embodiment of the powder feed chamber 11 is disposed at a downward angle A from the ingress opening 36 to the egress opening 37 such that both gravitational and vibratory forces act upon powder disposed therein to accelerate them out the egress opening 37. However, other arrangements would be readily apparent to those of ordinary skill in the art and, therefore, the orientation of the powder feed chamber 11 should not be so limited.

The powder egress opening 37 and the powder ingress opening 36 are little more than holes. The powder ingress opening 36 is an opening that accepts powder from an arbitrary source, such as a hopper, volumetric feeder or the like. For simplicity, the powder ingress opening 36 of a preferred embodiment is located at a height of the housing 10 to take advantage of gravitational effects. However, the powder ingress opening 36 may be in any location and have any configuration that allows the powder to contact a vibrating surface of the powder feed chamber 11, either by gravity or mechanical aid. As discussed in detail below, a preferred powder egress opening 37 is situated on the housing 10 to be located in communication with a die cavity or other powder receptacle. In this embodiment, the powder egress opening 37 is surrounded by a ring 39 of a material, such as ultra-high molecular weight polyethylene, that allows the housing 10 to vibrate without damage to mating components, such as feed shoes, feed rings, pipes or the like, and without significant loss of powder. In other embodiments, the communication between the powder egress opening 37 and the powder receptacle is a transport channel fluidly linking the two. Such a transport channel should provide a smooth transition between the powder egress opening and the powder receptacle to optimize the rate of flow of the powder with no sharp angles or ledges that would inhibit powder flow. The transport channel may take any one or a number of forces known to those skilled in the art, including a simple pipe.

FIG. 1 further illustrates an embodiment with a vibrator 40 located so as to vibrate the powder feed chamber 11. The vibrator 40 must be located such that the vibrational force is directed, at least partly, in the direction of flow of the powder. In this manner, the vibrator 40 acts to increase the rate of flow of the powder in the powder feed chamber over and above the rate of flow that is accomplished via gravity feed systems. The vibrator 40 is preferably attached to the outer surface 21 of the housing 10 via an extension 42. However, the vibrator may even be placed within the housing 10 attached to the powder feed chamber 11, although such an inner positioning is not preferred, as additional means to protect the vibrator 40 from the powder, may be required.

Another preferred embodiment of the present invention uses a Model FSB 160 air turbine vibrator manufactured by Vibco, Vibrational Products, Inc. It is operated at an air pressure of 40-60 psi, depending on the flow characteristics of the powder being fed through the powder feed apparatus. The manufacturers data sheet indicates that the vibrator vibrates at 10,500 vbm and produces a force of 225 pounds when operated at 60 psi.

When the powder feed chamber 11 is vibrated by the vibrator 40, the contact between the powder and the inner surfaces 18 of the powder feed chamber 11 transmits the vibrational force to the powder, reducing the effect of motion between the particles and the surfaces 18 and increasing the rate of flow through the powder egress opening. An unexpected advantage to this system is the fluidization of the powder caused by the vibration of the powder feed chamber 11. Fluidized powder is not powder that undergoes the physical property transformation of solid to liquid, but instead merely refers to a quantity of powder having physical characteristics similar to that of a fluid. Fluidized powder more uniformly occupies volume than other powder. As noted above, such uniformity is advantageous, and has previously been accomplished only via the pulsing of air through the powder. Accordingly, the ability of the present powder feed apparatus to fluidize many powders without the need for such air is a significant advantage over the prior art.

In the preferred embodiment of FIGS. 1-3, the powder feed apparatus 1, includes a housing 10 that is disposed within a frame 13 that acts to isolate the vibrations imparted to the housing 10 from the other components of the powder feed system, of which the powder feed apparatus is a part. The frame 13 has three sides 15, an open top and bottom, and a rear portion 17 that includes an open area to accommodate the rear portion of the housing 10. The frame 13 also includes two guide openings 19, one of which is cut through each of the sides 15 adjacent to the rear portion 17. These guide openings 19 are dimensioned to be slightly larger than guides 23 extending from the outer surface 21 of the housing 10 and through guide openings 19 such that the housing 10 is allowed to vibrate within a fixed range of motion within the frame 13. The space between the guides 23 and guide openings 19 is filled by o-rings 22. Lateral adjustment of the guides 23 within the openings 19 insures that the powder egress opening can be optimally located. The frame 13 includes attachment means, such as bolts or other fasteners (not shown) that allow the frame 13 to be fixedly attached to a wall, support, or another component of the powder press system.

Figure 4:
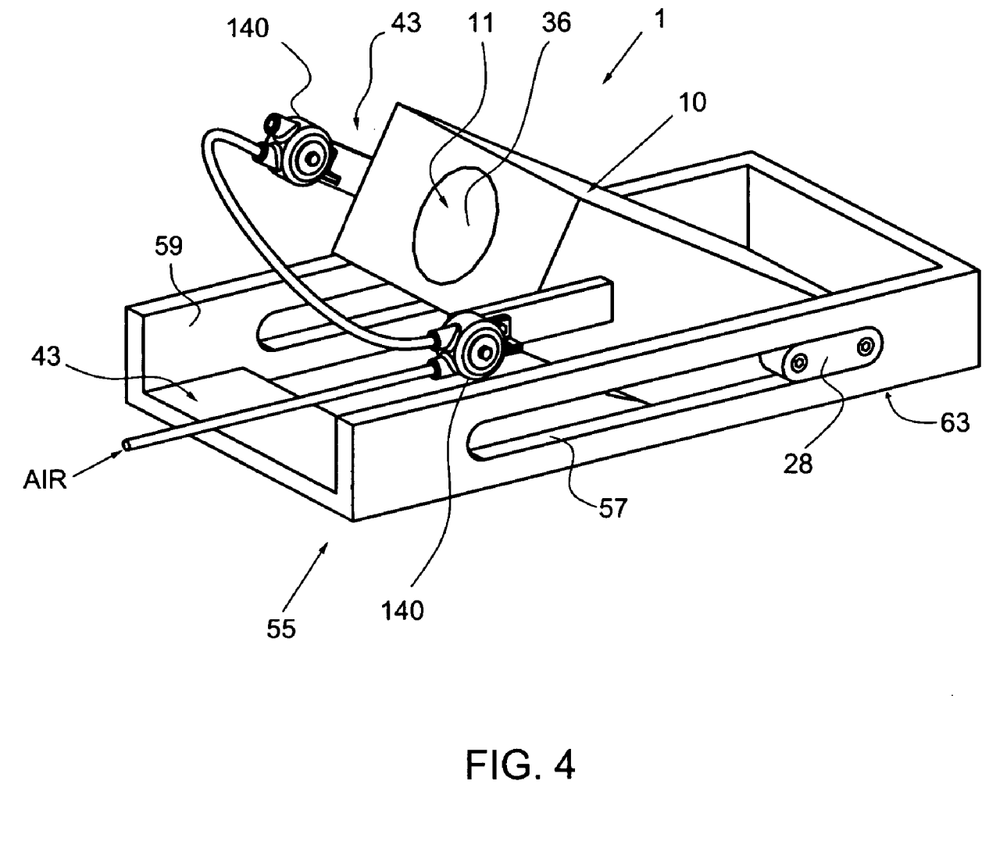
FIG. 4 is a top front isometric view of an alternative preferred embodiment of the powder feed apparatus of the present invention.

FIG. 4 shows an alternative preferred embodiment of the powder feed apparatus 1. In this embodiment, the frame 13 of FIGS. 1-2 is replaced with a rail system 55 which includes guides 28 that mate with slots in a pair of rails 57, 59 disposed in parallel relation to the sides of the housing 10. These guides may extend directly from the sides of the housing 10, in a manner similar to guides 23 described with reference to FIGS. 1-3. Like the frame 13, the rail system 55 preferably include an attachment plate 63 or other attachment means, such as bolts or other fasteners (not shown) that allow the rail system 55 to be fixedly attached to a wall, support, or another component of the powder feed system. The rail system 55 functions as a different means for isolating the housing 10 from other components of the powder feed system, and operates in that regard in much the same manner as the frame 13 described above. FIG. 4 also illustrates the use of two vibrators 140 rather than the single vibrator 40 of FIGS. 1-2. Use of multiple vibrators 140 is preferred in some embodiments as they have lower overall mass and volume and allow for the forces generated thereby to be additive. In addition, the use of multiple vibrators 140 that are not timed to actuate together allows the user to vary the magnitude and direction of the force created thereby in order to optimize flow for different types of powders. In embodiments utilizing multiple vibrators 140, the vibrators 140 are preferably positioned upon the housing 10 to create a substantially even weight distribution along the axis of travel of the housing 10. A substantially even weight distribution allows the housing 10 to travel as smoothly as possible along the rails 57, 59 and not favor a slanting path that serves to generate kinetic friction. As is the case with the embodiment shown in FIGS. 1-2, the vibrators 140 are not located directly upon the housing 10, but instead each is positioned upon an extension 43. The extensions 13 are each preferably made of a metal, metal alloy, or any other durable material capable of channeling vibrational energy from a vibrator 140 to the outside surface 21 of the housing 10. However, as noted above, the vibrators 140 could be mounted directly to the housing 10, or be integrated directly into the housing 10, to achieve similar results.

Figure 5:
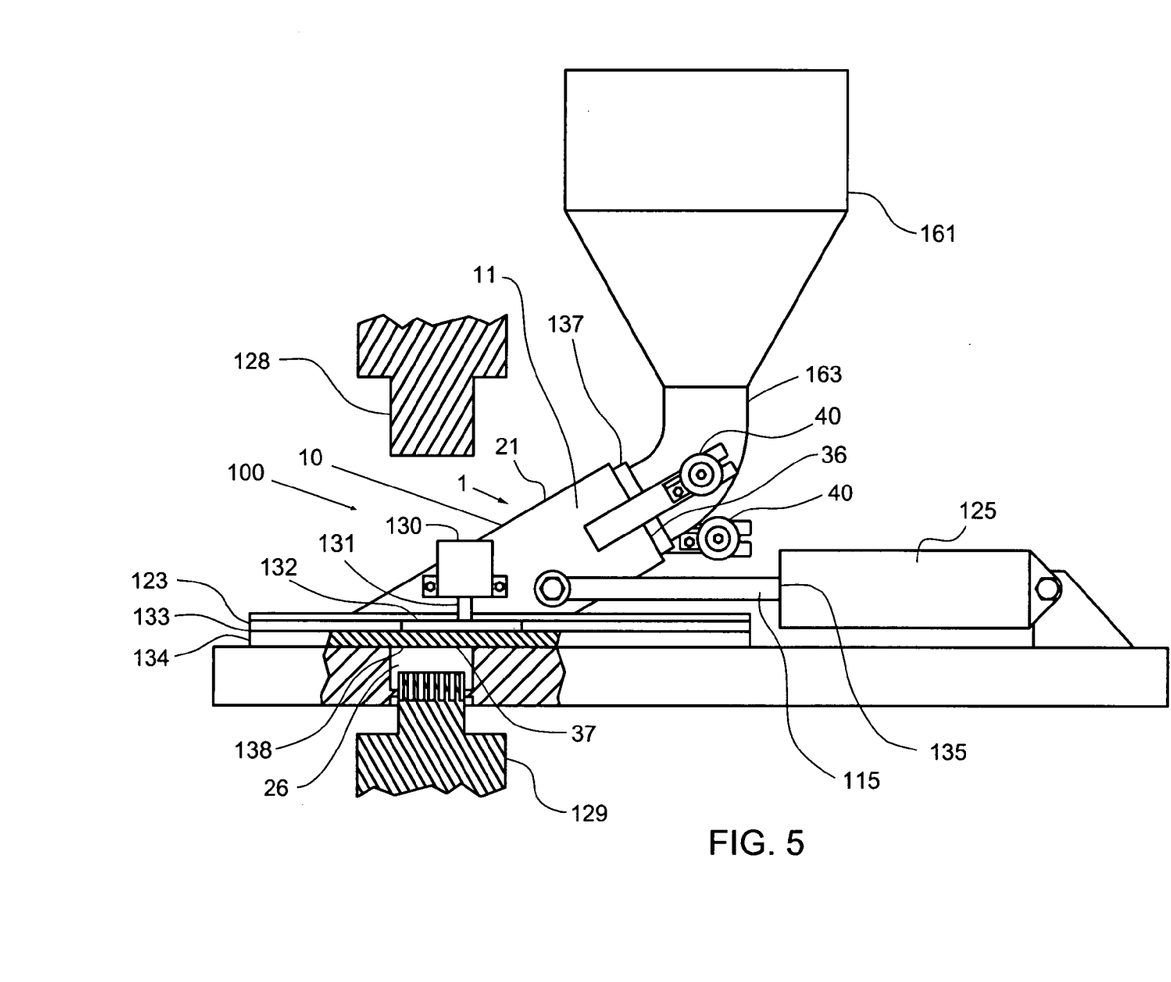
FIG. 5 is a cut away side view of a preferred embodiment of the powder feed system of the present invention.

FIG. 5 shows a preferred embodiment of the powder feed system 100. It shows the housing 10 as it relates to the feeding and delivery of powders into the die cavity 26 of the powder press. Above and below the die cavity 26 are a first die punch 128 and a second die punch 129 designed to converge upon the die cavity 26 in order to press a part. The housing 10 is organized to cooperate with a pneumatic piston 115 and an actuator cylinder 125, or any other suitable mechanical linkage known to those in the art for selectively reciprocating the housing 10, such as cams, motors, gears, hydraulic pistons, stepping motors, linear motion transducers, servo motors, etc. as will appear more clearly in association with the operational description that follows. Delivery of the housing 10 to and from the die cavity 26 can be in a linear or non-linear motion (i.e., swinging or pivoting back and forth) over the die cavity 26.

The powder feed chamber 11 is positioned to receive powder from a powder source, such as hopper 161, through a flexible hose 163. The powder feed chamber 11 has a powder ingress opening valve 137 to prevent powder escape from the powder feed chamber 11. Two bridge members 123 extend from the outside surface 21 of housing 10 to connect to elevation cylinders 130 mounted thereon. The bottom end of a piston 131 mounts a guide 132 and slidably engages the interior of the elevation cylinder 130. In operation, pressure is applied to the elevation cylinder 130 spatially to separate the piston 131 from the elevation cylinder 130. This separation elevates the bridge member 123 to lift the housing 10. A rail 133 is fixed to the wear plate of a die table 134 to allow the guide 132 to slide freely in a self-aligning linear motion thereon. This motion is actuated by a piston 115 sliding through an opening 135 inside an actuator cylinder 125 fixed to the wear plate of a die table 34. In use, pressure applied to the actuator cylinder 125 forces the piston 115 and its attached housing 10 forward. The actuator cylinder 125 can be operationally joined to any source of reciprocating motion, so that pressurized housing 10 may be translated linearly in operation to and from a die cavity for powdered metal part production. For that purpose, an opening 135 is provided in the actuator cylinder 125 to accept the piston 115.

The powder feed chamber 11 has a powder egress opening 37. A powder egress opening valve 138 controls powder flow from the powder feed chamber 11 to the die cavity 26. The bottom egress opening valve 138 has a closed position for containing powder material inside the powder feed chamber 11 and an open position for delivering powder to the die cavity 26 when the powder egress opening 37 registers with the die cavity 26. In applications where it is necessary or desirable to deliver more than one type of powder to a die cavity, the powder feed chamber 11 can have more than one egress opening 37 (not shown). Additionally, where it is desirable to deliver particulate material into very wide parts such as rings, gears etc., the powder feed chamber 11 can have multiple powder egress openings (not shown).

Figure 6:
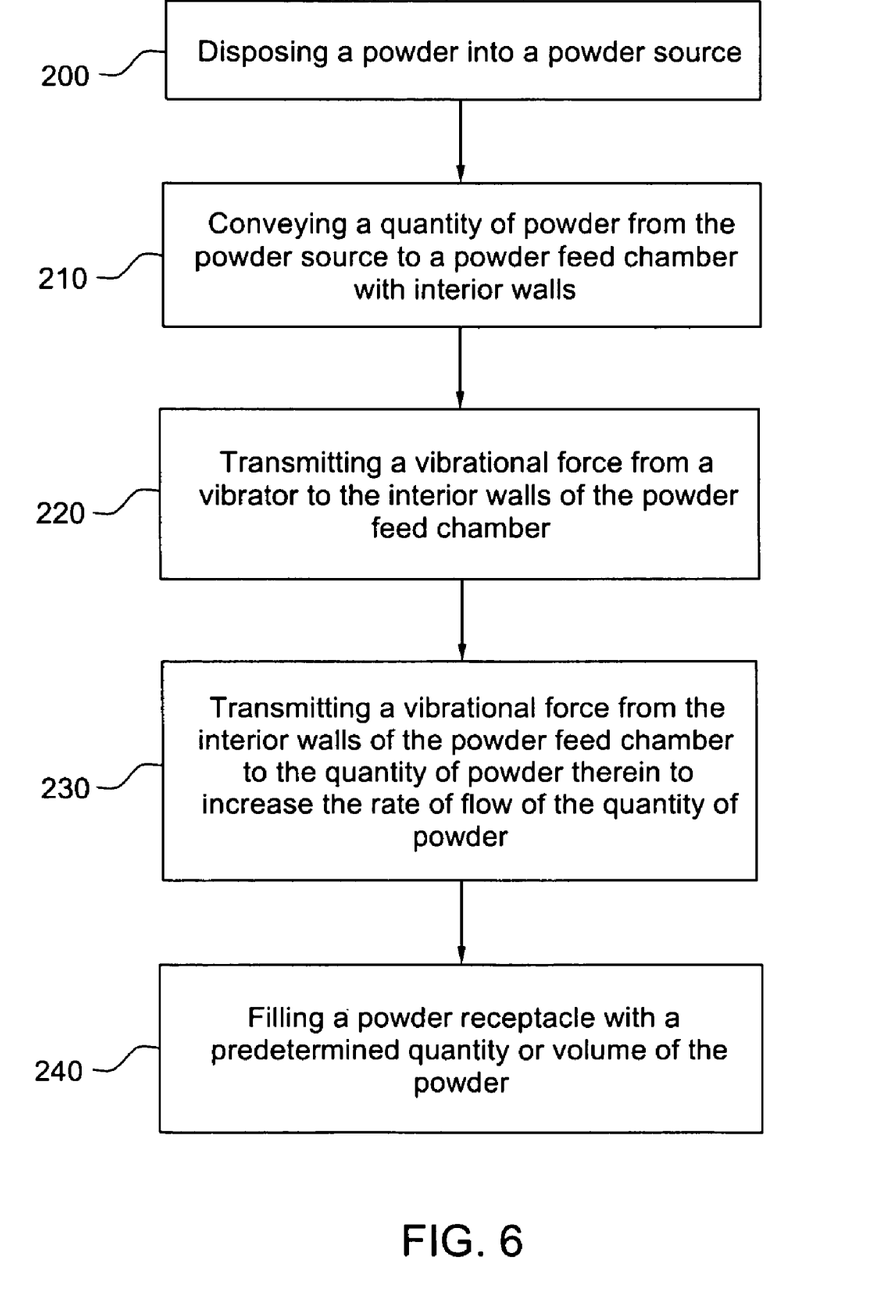
FIG. 6 is a flow chart of a preferred embodiment of the powder feed method of the present invention.

The present invention also includes a powder feed method for conveying powder to a powder receptacle, such as a feed shoe, feed ring or die cavity. A flow chart of a preferred embodiment of the method is shown in FIG. 6. This method consists of the steps of disposing a powder into a powder source 200, conveying a quantity of powder from the powder source to a powder feed chamber with interior walls 210, transmitting a vibrational force from a vibrator to the interior walls of the powder feed chamber 220 transmitting a vibrational force from the interior walls of the powder feed chamber to the quantity of powder therein to increase the rate of flow of the quantity of powder 230 and filling a powder receptacle with a predetermined quantity or volume of the powder 240. When these steps are completed, the volume of the powder within the powder receptacle is of substantially uniform density without the use of a separate means, such as pulsed air, for fluidizing the powder.

In the passing step, the fluidized powder maintains a state of fluidization until entry into the die cavity, after which simply letting the fluidized powder fall through an egress opening positioned above the die cavity is sufficient to fulfill such a purpose.

Although the present invention has been described in considerable detail with reference to certain preferred embodiments thereof, other embodiments will be readily apparent to those of ordinary skill in the art. Therefore, the spirit and scope of the appended claims should not be limited to the description of the preferred embodiments contained herein.

I hereby claim:

1. A powder feed system for feeding powder to a powder press comprising:

a source of a powdered material;

a powder receptacle; and a powder feed apparatus for increasing a rate of flow of the powdered material from said source to said powder receptacle, said apparatus comprising:

a housing, comprising an outer surface, a powder ingress opening in communication with said source of powdered material, a powder egress opening in communication with said powder receptacle, and a powder feed chamber in communication with said powder ingress opening and said powder egress opening, wherein said powder feed chamber is dimensioned substantially to transmit a vibrational force that is transmitted to said powder feed chamber to the powdered material disposed therethrough such that a rate of flow of the powdered material through said powder egress opening is increased over a rate of flow of the powdered material through said powder egress opening in the absence of the transmission of the vibrational force; and at least one vibrator in vibrational communication with said powder feed chamber, said at least one vibrator being dimensioned and located such that said at least one vibrator creates a vibrational force that is transmitted from said at least one vibrator to said powder feed chamber;

a frame or an attachment plate for attaching said housing to another component of the powder feed system, and means for isolating the vibrational force transmitted to said powder feed chamber from said attachment plate.

2. A powder feed system of claim 1 wherein the communication between said powder egress opening and said powder receptacle comprises a transport channel fluidly linking said powder egress opening to said powder receptacle.

3. A powder feed system of claim 2 wherein said powder receptacle is a feed shoe having a fill opening, and wherein said transport channel is a pipe disposed between said powder egress opening and said fill opening of said feed shoe.

4. A powder feed system of claim 2 wherein said powder receptacle is a feed ring having a fill opening, and wherein said transport channel is a pipe disposed between said powder egress opening and said fill opening of said feed ring.

5. A powder feed system of claim 1 wherein said means for isolating the vibrational force from said frame or attachment plate comprises a pair of rails fixedly attached to said attachment plate, and a pair of guides affixed to said housing, wherein said guides are slidably disposed upon said rails and allow said housing to slide back and forth along said rails.

6. A powder feed system of claim 1 wherein said at least one vibrator is an air driven turbine vibrator.

7. A powder feed system of claim 1 wherein said powder feed apparatus comprises at least two vibrators in vibrational communication with said powder feed chamber, and wherein each of said at least two vibrators is dimensioned and located such that each of said at least two vibrators creates a vibrational force that is transmitted to said powder feed chamber.

8. A powder feed system of claim 1 wherein said powder feed chamber is angled downward from said powder ingress opening to said powder egress opening.

9. A powder feed system of claim 1 wherein the powder within the powder receptacle is of substantially uniform density.

10. A powder feed system for feeding powder to a powder press comprising:
- a die cavity and at least one punch dimensioned to fit within said die cavity;
- a source of a powdered material; and
- a powder feed apparatus for increasing a velocity of the powdered material from said source to said powder receptacle, said apparatus comprising:
  - a housing, comprising an outer surface, a powder ingress opening in communication with said source of powdered material, a powder egress opening in communication with said die cavity, and a powder feed chamber in communication with said powder ingress opening and said powder egress opening, wherein said powder feed chamber is dimensioned substantially to transmit a vibrational force that is transmitted to said powder feed chamber to the powdered material disposed therethrough such that a velocity of the powdered material through said powder egress opening is increased over a velocity of the powdered material through said powder egress opening in the absence of the transmission of the vibrational force;
  - at least one vibrator in vibrational communication with said powder feed chamber, said at least one vibrator being dimensioned and located such that said at least one vibrator creates a vibrational force that is transmitted from said at least one vibrator to said powder feed chamber;
  - a frame or an attachment plate for attaching said housing to another component of the powder feed system, and
  - means for isolating the vibrational force transmitted to said powder feed chamber from said attachment plate.

11. A powder feed system of claim 10 wherein the communication between said powder egress opening and said die cavity comprises said at least one die punch that has an interior that defines a transport channel fluidly linking said powder egress opening with said die cavity.

12. A powder feed system of claim 10 wherein the communication between said powder egress opening and said die cavity comprises a powder receptacle and a transport channel fluidly linking said powder egress opening to said powder receptacle, wherein said powder receptacle is dimensioned and located such that it communicates powder from said transport channel to said die cavity.

13. A the powder feed system of claim 12 wherein said powder receptacle is a feed shoe having a fill opening, and wherein said transport channel is a pipe disposed between said powder egress opening and said fill opening of said feed shoe.

14. A powder feed system of claim 12 wherein said powder receptacle is a feed ring having a fill opening, and wherein said transport channel is a pipe disposed between said powder egress opening and said fill opening of said feed ring.

15. A powder feed system of claim 10 wherein said means for isolating the vibrational force from said frame or attachment plate comprises a pair of rails fixedly attached to said attachment plate, and a pair of guides affixed to said housing, wherein said guides are slidably disposed upon said rails and allow said housing to slide back and forth along said rails.

16. A powder feed system of claim 10 wherein said at least one vibrator is an air driven turbine vibrator.

17. A powder feed system of claim 10 wherein said powder feed apparatus comprises at least two vibrators in vibrational communication with said powder feed chamber, and wherein each of said at least two vibrators is dimensioned and located such that each of said at least two vibrators creates vibrational forces that are transmitted from said at least two vibrators to said powder feed chamber.

18. A powder feed system of claim 10 wherein said powder feed chamber is angled downward from said powder ingress opening to said powder egress opening.

19. A powder feed system of claim 10 wherein the powder within the powder receptacle is of substantially uniform density.

* * * * *